April 1, 1930.  T. CORNS  1,752,837

APPARATUS FOR MANUFACTURING PIES

Filed June 26, 1928  3 Sheets-Sheet 1

Inventor
Thomas Corns

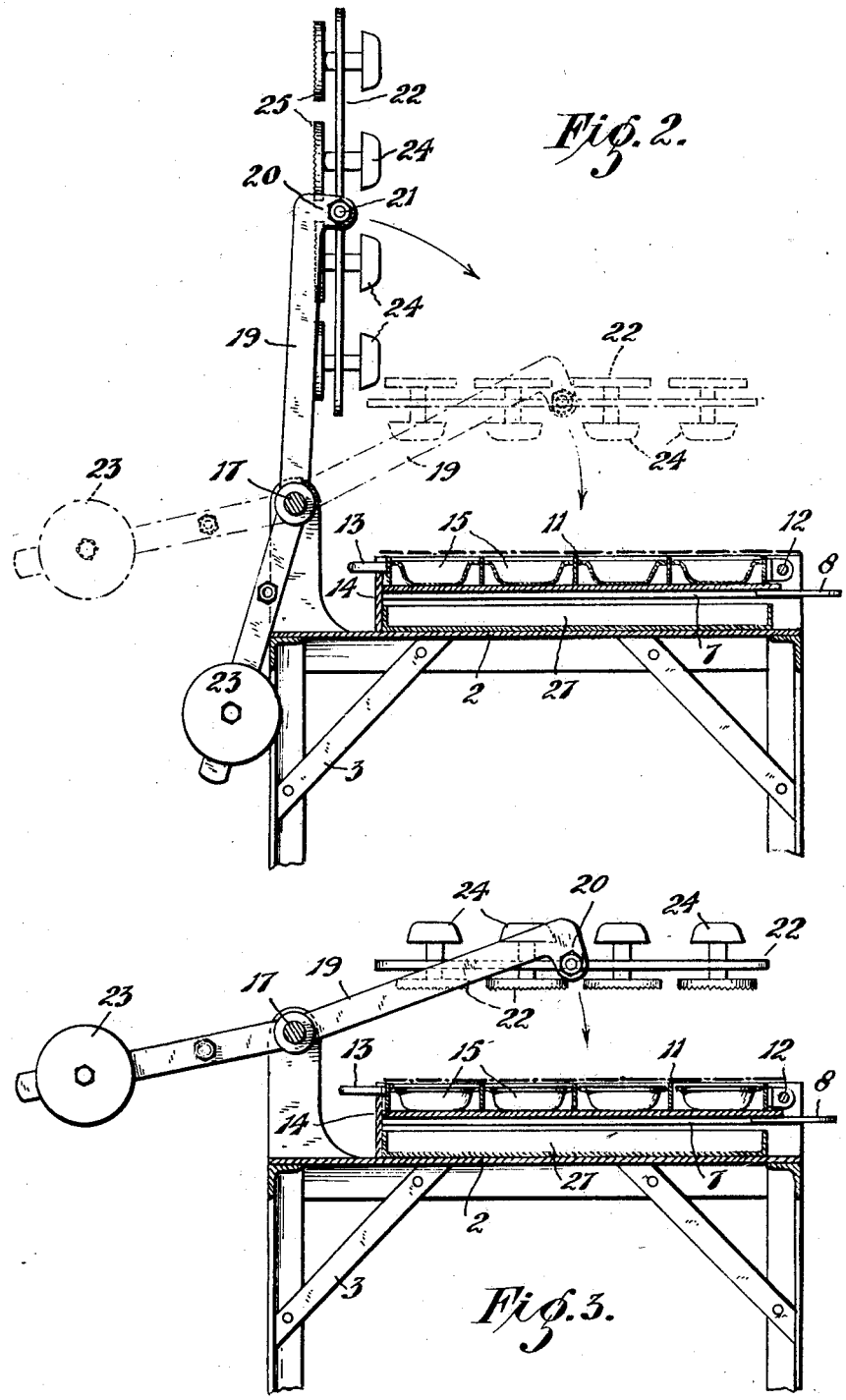

April 1, 1930.  T. CORNS  1,752,837
APPARATUS FOR MANUFACTURING PIES
Filed June 26, 1928  3 Sheets-Sheet 3

Inventor;
Thomas Corns

Patented Apr. 1, 1930

1,752,837

UNITED STATES PATENT OFFICE

THOMAS CORNS, OF RICHMOND, VICTORIA, AUSTRALIA

APPARATUS FOR MANUFACTURING PIES

Application filed June 26, 1928, Serial No. 288,408, and in Australia August 31, 1927.

This invention relates to an improved apparatus for use in the manufacture of meat pies, fruit pies and similar articles of food.

According to present methods of making pies, it is customary to cut blanks of desired shape from rolled paste and to manually press these blanks into the pie tins or similar cooking containers. The meat or other filling having been inserted into the pie shells within the tins, a covering piece of rolled paste is applied also by hand, after which manual cutting and trimming operations are performed. This method of manufacture is laborious and relatively costly. Furthermore, it does not conduce to the making of pies having desired uniformity of appearance.

The present invention has been devised to overcome these disadvantages, and to provide an improved apparatus by the use of which pies, in large quantities, can be made expeditiously and with considerable saving in handling and of labor costs.

The improved apparatus dispenses with the necessity of cutting separate blanks from the rolled paste, and it is characterized chiefly by improved means for pressing the rolled paste into the cooking tins to form the pie shells, improved means for cutting the paste around the tins and crimping the edges of the pies, and improved means for automatically depositing the tins containing the pies onto an oven tray or the like. Other constructional features are included in the invention and are hereinafter fully described.

In the drawings:—

Figure 2 is a sectional side view of the apparatus showing the first operation of pressing the paste into the cooking tins.

Figure 3 is a similar view to Figure 2, but showing the operation of cutting the paste around the tins and of crimping the edges of the pies.

Figure 1:
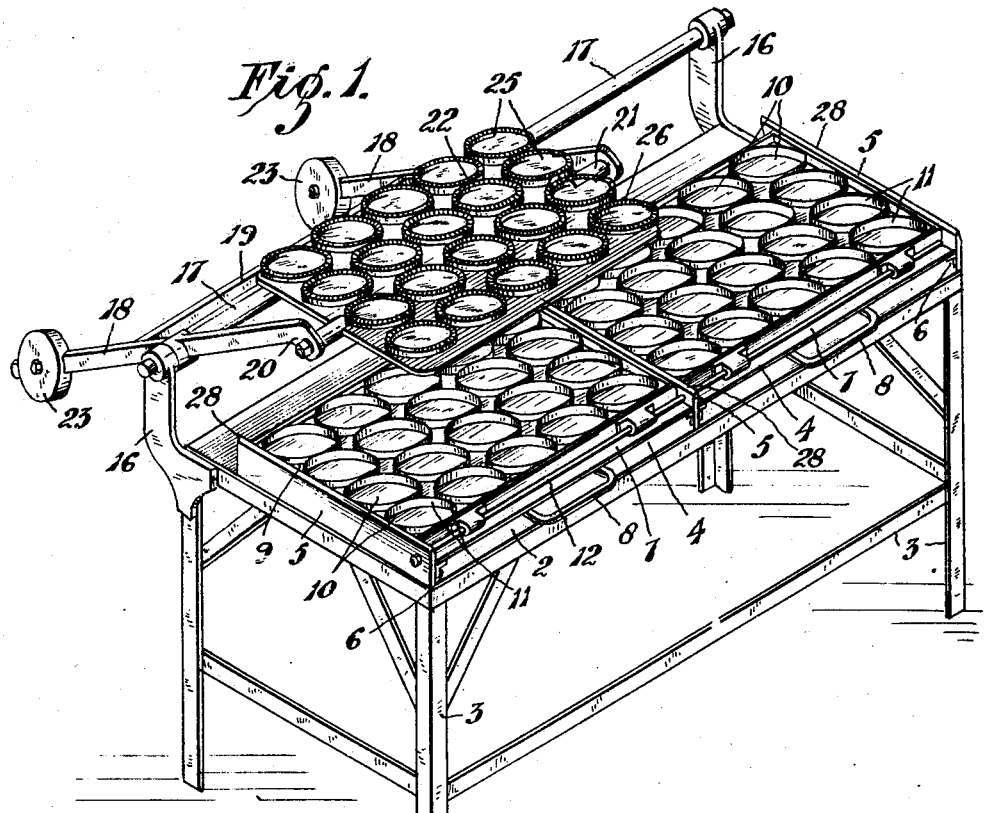
Figure 1 is a view in perspective of the improved apparatus.
Figure 5:
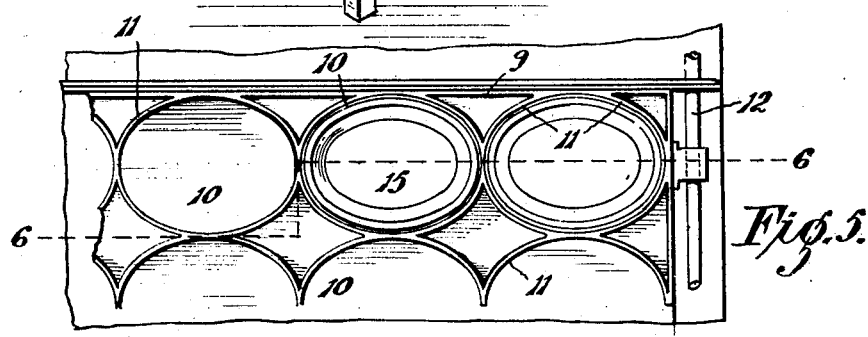
Figure 5 is a plan view of part of the table portion of the apparatus.

The improved pie-making apparatus has a flat table 2 supported by a framework 3. This table may be of any required length to support a desired number of sections 4, but for convenience of illustration only two of such sections are shown in the drawings. The table 2 has upstanding transverse plates 5 which form the end walls of the sections 4. These transverse plates carry angle-iron or like guides 6, which slidably support drawplates 7, one for each section 4. Each drawplate has a handle 8 at its forward end, whereby it can be conveniently withdrawn from the guides 6.

Mounted above the draw-plate of each section is a tray member 9 constructed with a series of openings 10 of desired configuration according to the shape of the pies to be made. Around the margin of each opening 10 is a cutting edge 11 which projects upwardly for a desired distance above the surface of the tray member. Each tray member is hinged at its forward side on a hinge rod 12, which is supported by the plates 5 and may extend longitudinally the whole length of the table to hingedly support the tray members of all of the sections 4. At the rear side of each tray member there is a handle 13, by which the tray may be hingedly swung open, as shown in dotted lines in Figure 4, to dislodge scraps of paste adhering thereto. When the trays are closed, the handles 13 bear against a rear bar 14 on the table and prevent any downward movement of said trays during the shaping and cutting of the pies.

Figure 6:
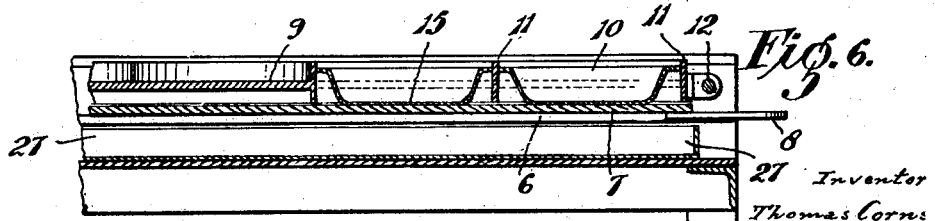
Figure 6 is a section on line 6—6 of Figure 5.
Figure 7:
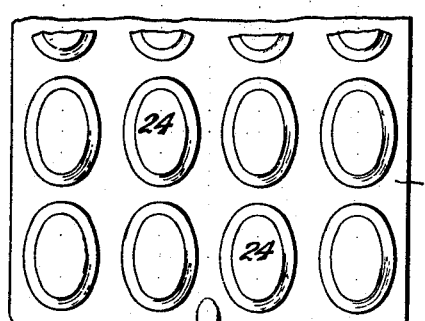
Figure 7 is a face view of one side of the pressure plate, showing the dies for pressing the paste into the cooking tins.
Figure 8:
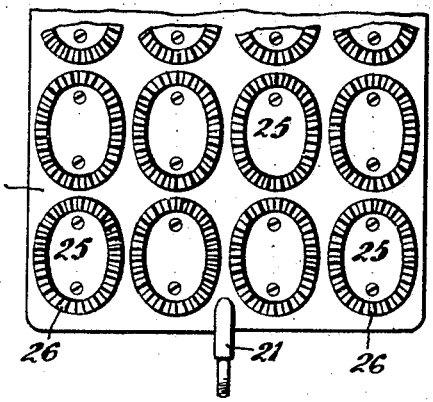
Figure 8 is a face view of the reverse side of the pressure plate illustrating the members for cutting and crimping the pies.
Figure 9:
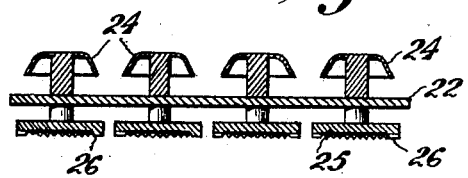
Figure 9 is a cross-sectional view of the pressure plate.

The openings 10 in the tray members freely accommodate the pie tins 15 or other cooking containers, which are supported upon the draw-plates 7 beneath said openings. The upper edges of the pie tins are located a short distance below the cutting edges 11, as shown in Figure 6, to provide ample clearance for the paste. If desired, the guides 6 for the slidable draw-plates 7 may be vertically adjustable, or other adjustment means can be provided whereby said draw-plates can be raised or lowered to suit the height of the pie tins that at any time are being used.

Provided at opposite ends of the framework 3 are two standards 16 supporting a longitudinal rod or shaft 17. Pivotally mounted on said shaft is a frame consisting of two levers 18 and connecting stays 19. The levers 18 at their forward ends have bearings 20, which swivelly receive pintle members 21 on the ends of a reversible pressure plate 22. The weight of said pressure plate is balanced by counterbalance weights 23 fitted on the rear ends of the levers 18.

Mounted on one side of the pressure plate are dies or formers 24 corresponding in shape to the internal configuration of the pie tins 15 in the tray members 9. The opposite side of said pressure plate carries a series of cutters 25 of such size as will co-act satisfactorily with the upstanding cutting edges 11 of said tray members 9. Each of said cutters 25 has a serrated portion 26 around its periphery to crimp the edge portions of the pies whilst they are being severed.

In the use of the apparatus, oven trays indicated by 27 are positioned on the table beneath the draw plates 7, and the greased pie tins or cooking containers 15 are placed in the openings 10 in the tray members 9 as shown in Figure 2. A rolled sheet of paste is now applied over the tray members and the supported pie tins to thus cover as many as desired of the sections 4. The pressure plate 22 is now swivelled on its pintles 21 to bring its dies or formers 24 to underneath position, and said pressure plate is then pivotally swung downwards causing said dies to press the paste into the pie tins and produce the pie shells. The meat or other filling is next ladled or otherwise fed into the pie shells, after which a covering sheet of paste is applied over the tray members 9.

The pressure plate is now swivelly reversed on its pintles to bring the cutters 25 to underneath position and said pressure plate is moved downwardly to cause the cutters to neatly sever both thicknesses of paste against the cutting edges 11, thus separating the pies from the surplus paste between the openings 10. During the described cutting action, the serrated portions 26 of the cutters unite the two thicknesses of paste constituting the pie shells and the cover portions and simultaneously crimp the marginal portions of the pies in appropriate manner.

Figure 4:
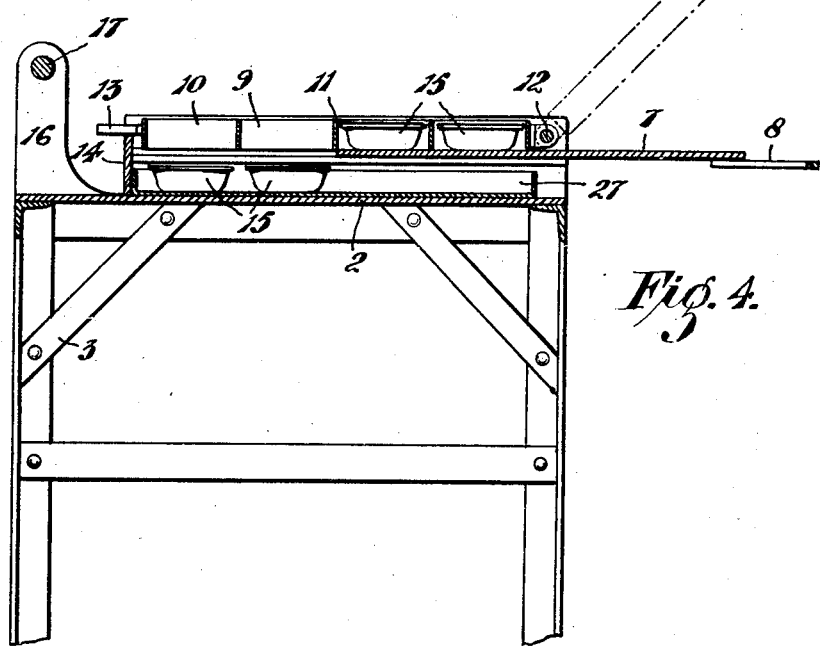
Figure 4 is a sectional view illustrating the means for automatically depositing the pie tins onto the oven tray.

Following the severing and crimping of the pies, the draw-plates 7 are slidably withdrawn by their handles 8, see Figure 4, thus causing the pies to drop through the openings 10 and be automatically deposited onto the oven trays 27, which latter are then conveniently removed from the apparatus. By hingedly raising the tray members 9, as shown in dotted lines in Figure 4, the surplus paste remaining on the upper surface of said tray members is dislodged and discharged into suitable receptacles provided for the purpose.

The frame supporting the reversible pressure plate 22 can be slidably mounted on the longitudinal rod 17 so that it may be moved along to any desired section 4 of the apparatus. With this construction, it is possible to work progressively along the apparatus, so that while the paste is being pressed into the pie tins in one section, the pie fillings can be deposited into the pie shells of preceding sections, and while the pies are being cut and removed from sections at one end of the apparatus, other greased tins can be inserted in the sections at the opposite end. By this means, the manufacture of the pies can be performed very expeditiously.

If desired, the transverse plates 5 between the sections of the apparatus may have cutting edges 28 to co-act with the pressure plate and thus sever the paste at the end of each section. Other modifications may be made in a pie-making apparatus according to the invention and within the ambit of the appended claiming clauses.

What I do claim is:—

1. Improved apparatus for manufacturing pies comprising, a plurality of tray members having openings to accommodate pie tins or cooking containers, cutting edges around said openings, means for pressing the paste into the pie tins to form the pie shells, means for severing the pies against said cutting edges, oven trays supported beneath the tray members, and means for discharging the pie tins from the openings onto said oven trays.

2. Improved apparatus for manufacturing pies comprising, a plurality of tray members having openings to accommodate pie tins or cooking containers, cutting edges around said openings, a draw-plate slidable beneath each of said tray members, dies or formers adapted to press the paste into the pie tins, cutters adapted to sever the pies against said cutting edges, a mounting for said dies and cutters, and an oven tray supported beneath each tray member onto which the pies are deposited when the draw-plates are withdrawn.

3. Improved apparatus for manufacturing pies comprising, a plurality of tray members having openings to accommodate pie tins or cooking containers, cutting edges around said openings, a draw-plate slidable beneath each of said tray members, a reversibly mounted pressure plate capable of being pivotally moved downwardly against the pie tins, dies or formers on one side of said pressure plate to press the paste into the pie tins, cutters on the other side of said pressure plate to sever the pies against the cutting edges of the openings, and an oven tray supported beneath each tray member onto which the pies are deposited when the draw-plates are withdrawn.

4. Improved apparatus for manufacturing pies as claimed in claim 3, and wherein the pressure plate is slidable longitudinally along the apparatus whereby it can be operated on each of the tray members successively.

5. Improved apparatus for manufacturing pies as claimed in claim 3, and wherein the tray members are hinged so that they can be hingedly opened to dislodge surplus paste and deposit same into receptacles.

6. In apparatus for manufacturing pies, the combination of a tray member having a plurality of openings to accommodate pie tins or cooking containers, cutting edges projecting upwardly around said openings, a draw-plate slidable beneath said tray member and supporting said pie tins, means for severing the pies against said cutting edges, and means for supporting an oven tray beneath the tray member whereby the pie tins are deposited thereonto when the draw-plate is withdrawn.

7. In apparatus for manufacturing pies, the combination of a tray member having a plurality of openings to accommodate pie tins or cooking containers, cutting edges projecting upwardly around said openings, a reversible pressure plate having dies or formers on one side to press the paste into the pie tins, and cutters on the opposite side of said pressure plate for severing the pies against the cutting edges of the tray openings.

In testimony whereof I affix my signature.

THOMAS CORNS.